United States Patent
Takahashi et al.

(10) Patent No.: US 6,286,995 B1
(45) Date of Patent: Sep. 11, 2001

(54) TEMPERATURE SENSOR

(75) Inventors: Sotoo Takahashi, Okazaki; Matsuo Fukaya, Oobu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/384,228

(22) Filed: Aug. 27, 1999

(30) Foreign Application Priority Data

Sep. 22, 1998 (JP) .................................. 10-268513
Apr. 7, 1999 (JP) .................................. 11-100316

(51) Int. Cl.⁷ .................................. G01K 1/14; G01K 1/08
(52) U.S. Cl. .................................. 374/148; 374/208
(58) Field of Search .................................. 374/208, 148, 374/163, 158, 179

(56) References Cited

U.S. PATENT DOCUMENTS

| | | | |
|---|---|---|---|
| 3,147,457 | * 9/1964 | Gill et al. | 374/163 |
| 3,966,500 | * 6/1976 | Brixy | 374/163 |
| 4,168,626 | * 9/1979 | Fullager | 374/158 |
| 4,453,835 | * 6/1984 | Clawson et al. | 374/208 |
| 4,485,263 | * 11/1984 | Itoyama et al. | 374/208 |
| 4,737,038 | * 4/1988 | Dostoomian | 374/139 |
| 5,046,857 | * 9/1991 | Metzger et al. | 374/135 |
| 5,348,396 | * 9/1994 | O'Rourke et al. | 374/161 |
| 5,462,359 | * 10/1995 | Reichl et al. | 374/208 |
| 5,696,348 | * 12/1997 | Kawamura et al. | 374/208 |
| 5,743,646 | * 4/1998 | O'Connell et al. | 374/148 |
| 5,951,165 | * 9/1999 | Platt | 374/179 |
| 5,999,081 | * 12/1999 | Hannigan et al. | 338/28 |
| 6,020,552 | * 2/2000 | Rickman | 136/230 |
| 6,102,565 | * 8/2000 | Kita et al. | 374/179 |

FOREIGN PATENT DOCUMENTS

| | | | |
|---|---|---|---|
| 3522433 | * 1/1986 | (DE) | 374/208 |
| 40 21 997 A1 | 1/1991 | (DE) . | |
| 1288739 | * 11/1989 | (JO) | 374/208 |
| 0052834 | * 1/1986 | (JP) | 374/208 |
| 4-276530 | 10/1992 | (JP) . | |
| 7-201523 | 8/1995 | (JP) . | |
| 9-126910 | 5/1997 | (JP) . | |

* cited by examiner

*Primary Examiner*—Diego Gutierrez
*Assistant Examiner*—Gail Verbitsky
(74) *Attorney, Agent, or Firm*—Pillsbury Winthrop LLP Intellectual Property Group (57) ABSTRACT

In a temperature sensor inserted into a hole formed in a wall of an exhaust gas passage thereby to set a temperature sensitive element in position in the passage, a metal rib in close contact with a hole for preventing the leakage of the exhaust gas is welded over the entire outer peripheral surface of a metal outer cylinder at the end thereof nearer to the passage, and a cylindrical metal sleeve for covering lead wire connecting portions is welded over the entire periphery of a protrusion of the rib at a position further away from the passage than the coupling portion between the rib and the outer cylinder.

13 Claims, 5 Drawing Sheets

TEMPERATURE SENSOR

BACKGROUND OF THE INVENTION

1. Field of the Invention

The present invention relates to a temperature sensor comprising a temperature sensitive element arranged in a fluid passage for detecting the temperature of the object fluid flowing in the fluid passage.

2. Description of the Related Art

A well-known temperature sensor of this type is used on an automobile (for example, Japanese Unexamined Patent Publications No. 7-201523, No. 9-126910, etc.). This type of temperature sensor is used as an exhaust gas temperature sensor and includes a temperature sensitive element (such as a thermistor element) for detecting the temperature of an exhaust gas (object fluid) flowing in an exhaust gas passage (flow passage). The sensor is generally mounted in the exhaust gas passage in the manner shown in FIG. 1A.

Figure 1A:
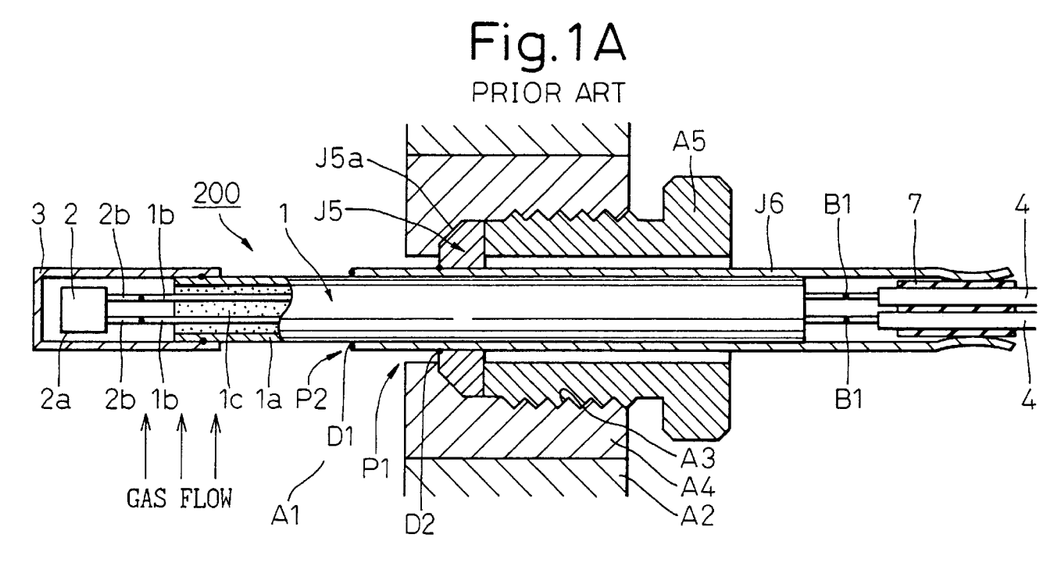
FIGS. 1A, 1B are diagrams for explaining a conventional temperature sensor.

This temperature sensor 200 comprises a wiring member (sheath pin) 1 including a metal outer cylinder 1a and a pair of conductive core wires 1b held in the metal outer cylinder 1a through an insulating material, a temperature sensitive element (such as a thermistor element) connected to the ends of the core wires 1b at an end of the wiring member 1, and a pair of lead wires 4 connected to the other ends of the core wires 1b at the other end of the wiring member 1 for connecting an external circuit, wherein the wiring member 1 is inserted in a hole A3 formed in a wall portion A2 defining the exhaust gas passage A1 thereby to set the temperature sensitive element 2 in position in the exhaust gas passage A1.

In this configuration, the connecting portions (lead wire coupling portions) B1 between the core wires 1b and the lead wires 4 are protected by being covered with a cylindrical protective member (sleeve) J6. This protective member J6 is coupled around the whole periphery of the weld zone (coupling portion) D1 along the outer peripheral surface of the outer cylinder 1a. Also, a seal member J5 for preventing the leakage of the exhaust gas from the hole A3 is coupled around the whole outer peripheral surface of the protective member J6 in the weld zone (coupling portion) D2.

This seal member J5, as shown in FIG. 1A, includes a tapered seat surface J5a corresponding to the tapered surface of the hole A3. By bringing the seat surface J5a in close contact with the tapered surface of the hole A3 by a screw A5, the exhaust gas is prevented from leaking from the hole A3.

Also, a metal cap 3 made of a heat-resistant metal is coupled around the whole outer peripheral surface of the outer cylinder 1a at an end of the wiring member 1. The temperature sensitive element 2 is housed in the metal cap 3 and thus is protected from the exhaust gas. The output of the temperature sensitive element 2 is retrieved by an external circuit, not shown, by way of the lead wires 4 from the core wires 1b of the wiring member 1 thereby to detect the temperature of the exhaust gas.

In the case where the temperature sensitive element 2 is disposed in the exhaust gas passage A having this constitution, however, the weld zones D1 and D2 are exposed to the exhaust gas in the exhaust gas passage A1, and therefore the exhaust gas is required to be sealed from the outside of the passage at three points including the seat surface J5a of the seal member J5 and the weld zones D1 and D2. Especially, since there are two coupling portions where maintenance of air-tightness is required, the resulting constitution is extremely unreliable from the viewpoint of the sealing of the exhaust gas.

Also, from the viewpoint of the improvement of the sensor response, the component members of the temperature sensitive portion of the sensor, i.e. the temperature sensitive element 2, the metal cap 3 and the wiring member 1 are preferably reduced in diameter. In that case, the protective member J6 coupled to the outer cylinder 1a of the wiring member 1 is also required to be reduced in diameter. The portion of the protective member J6 for protecting the lead wire coupling portions B1, on the other hand, is required to secure a sufficient space for welding or arranging a connector for connecting the core wires 1b and the lead wires 4. Therefore, the diameter of the portion of the protective member J6 for protecting the lead wire coupling portions B1 constitutes a controlling factor for determining the diameter of the protective member J6.

As is shown in FIG. 1A, however, the protective member J6 is straight in shape. The diameter of the protective member J6 cannot be reduced more than necessary, therefore, for securing the diameter of the protective portion of the lead wire coupling portions B1. Also, the diameter of the wiring member 1, which is coupled to the inner peripheral surface of the protective member J6 on the outer peripheral surface of the outer cylinder 1a thereof, is determined by the diameter of the protective member J6 and therefore cannot be easily reduced.

Figure 1B:
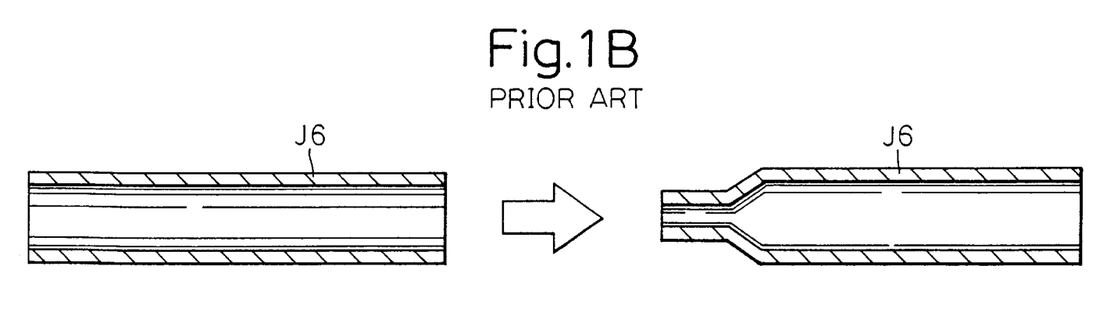

For improving the response of the temperature sensor, a deformed protective member (stepped sleeve) J6 shown in FIG. 1B may be employed in which the portion for protecting the lead wire coupling portions B1 and the portion D1 for coupling with the outer cylinder 1a of the wiring member 1 have different diameters. This constitution requires, however, not only the cutting of the pipe but the drawing on machining of the protective member, thereby leading to a considerably increased machining cost for an increased production cost.

The problems of sealing and the protective member described above are not confined to the temperature sensor for detecting the exhaust gas temperature. Specifically, the problems are shared by temperature sensors comprising a wiring member with one end connected to a temperature sensitive element and the other end connected to lead wires and a cylindrical protective member for covering the connecting portion of the lead wires, wherein the wiring member is arranged in the fluid passage by being inserted in a hole formed in the wall portion of a fluid passage.

SUMMARY OF THE INVENTION

In view of the problem points of the prior art described above, the object of the present invention is to provide a temperature sensor comprising a temperature sensitive element arranged in a fluid passage through the wall portion of the fluid passage for detecting the temperature of the object fluid, wherein the sealing of the object fluid is reliably improved while at the same time reducing the diameter of the sensor without increasing the cost.

In order to achieve the object described above, according to the present invention, there is provided a temperature sensor wherein a seal member for preventing the leakage of the object fluid is arranged in close contact with a hole formed in wall portion defining a fluid passage and is coupled over the entire outer peripheral surface of an outer cylinder constituting protective member covering the connecting portions between core wires of the wiring member and lead wires for connecting an external circuit is coupled to the seal member at a portion farther away from the temperature sensitive element than the coupling portion between the seal member and the outer cylinder.

As a result, the coupling portion of the protective member exposed to the object fluid in the prior art is not exposed to the object fluid, since the protective member is coupled to the seal member at the portion further away from the temperature sensitive element than the coupling portion between the seal member and the outer cylinder. Only one coupling portion between the seal member and the outer cylinder is exposed to the object fluid, thereby improving the reliability of sealing.

Also, the wiring member is coupled to the seal member on the outer peripheral surface of the outer cylinder 1a and the protective member is coupled to the seal member. The diameter of one of the wiring member and the protective member, therefore, is not affected by the diameter of the other. Thus, the cylindrical protective member, while maintaining a straight form, can secure a sufficient space for the lead wire connection. At the same time, the outer diameter of the outer cylinder, i.e., the outer diameter of the wiring member can be reduced, so that the sensor can be reduced in diameter without increasing the cost.

According to another aspect of the invention, there is provided a temperature sensor wherein a protrusion along the axial direction of the outer cylinder extending outward of the fluid passage is formed on the seal member, and the protective member is coupled to the outer peripheral surface or the inner peripheral surface of the protrusion.

As a result, the protective member and the seal member can be coupled to each other not on the cylinder end surface of the protective member but on the outer peripheral surface or the inner peripheral surface of the cylinder. As compared with the coupling on the cylindrical end surface, therefore, the coupling area can be increased for an improved coupling strength.

According to still another aspect of the invention, there is provided a temperature sensor wherein the protective member and the outer cylinder of the wiring member are fixedly caulked to each other, so that the wiring member is not easily vibrated and is resistant to external vibrations.

BRIEF DESCRIPTION OF THE DRAWINGS

The above and other objects, features and advantages will be made apparent to those skilled in the art by the detailed description taken in conjunction with the accompanying drawings, in which.

DESCRIPTION OF THE PREFERRED EMBODIMENTS (First embodiment)

Figure 2:
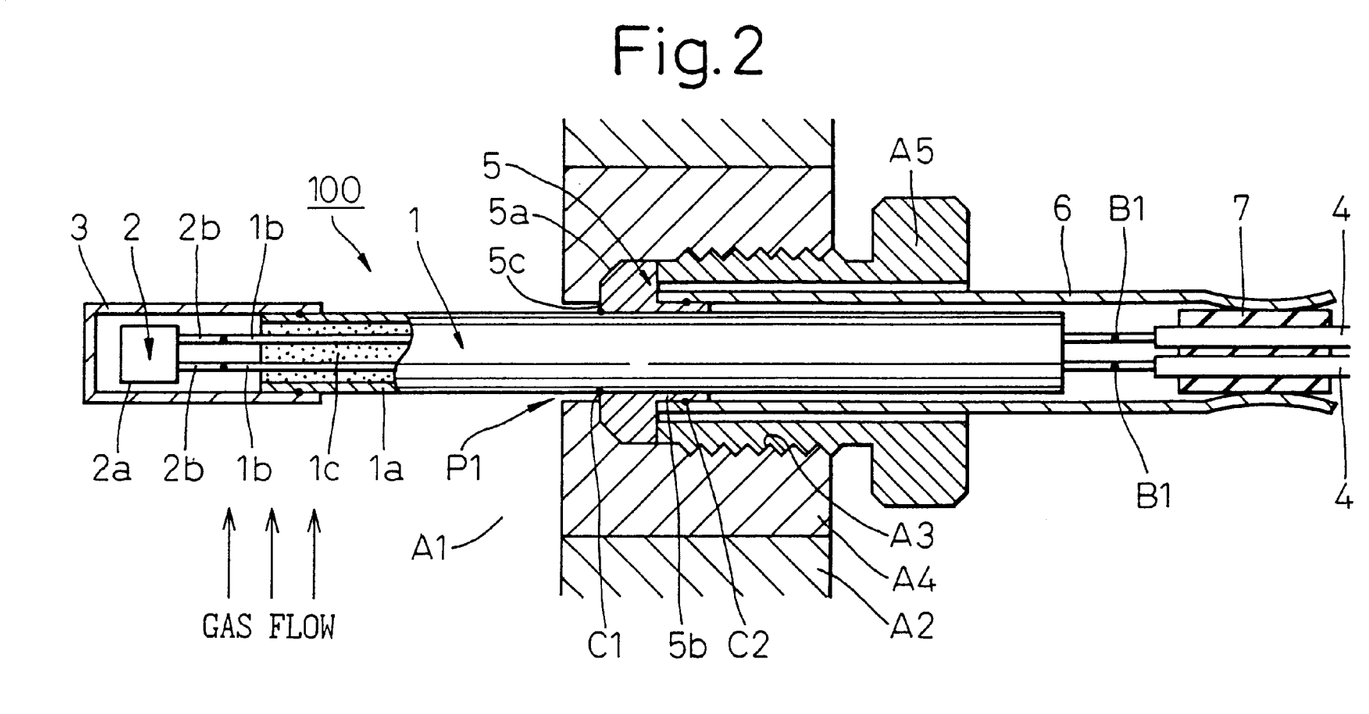
FIG. 2 is a sectional view for explaining a general configuration of a temperature sensor according to a first embodiment of the invention.

FIG. 2 is a sectional view showing a general configuration of a temperature sensor 100 according to a first embodiment of the invention. An explanation will be given on the assumption that the temperature sensor 100 is mounted in an exhaust gas passage (fluid passage) A1 of an automobile as an exhaust gas temperature sensor for detecting the temperature of the exhaust gas (object fluid) of an internal combustion engine flowing in the passage A1.

This embodiment represents an improvement of the constitution of the seal member, the protective member and the portions for coupling them of the conventional temperature sensor 200 shown in FIG. 1A. Therefore, the same component parts including the wiring member 1, the temperature sensitive element 2, the metal cap 3 and the lead wires 4 in FIG. 2 are designated by the same reference numerals as the corresponding component parts shown in FIG. 1A.

The sheath pin 1 constituting the wiring member includes, for example, a metal outer cylinder 1a made of stainless steel SUS310S, a pair of conductive core wires 1b made of a metal such as SUS310S and insulating powder 1c of a material such as MgO filled for insulating between the outer cylinder 1a and the core wires 1b and holding the core wires 1b.

The sheath pin 1 is produced by arranging a pair of the core wires 1b in the outer cylinder 1a in spaced relation with each other in the direction substantially parallel to the axis of the outer cylinder 1a, and after filling the insulating powder 1c in the outer cylinder 1a, repeating the steps of reducing the diameter of a thick material and annealing.

A thermistor element can be used, for example, as a temperature sensitive element arranged at an end of the sheath pin 1 for detecting the temperature of the exhaust gas. According to this embodiment, the temperature sensitive element 2 includes a solid cylindrical element portion 2a made of a thermistor material such as a semiconductor oxide and a pair of electrode wire 2b led out toward the sheath pin from the element portion 2a. The pair of the electrode lines 2b are electrically connected by laser welding or resistance welding to an end of each core wire 1b of the sheath pin 1.

Also, the sheath pin 1 has, at an end thereof, a metal cap (protective cover made of a metal) 3 in the shape of bottomed cylinder made of a heat-resistant metal such as SUS310S for accommodating and protecting the temperature sensitive element 2. The metal cap 3 has the temperature sensitive element 2 sealed therein by wrapping the inner peripheral surface of the cylinder opening portion with the outer peripheral surface of the outer cylinder 1a of the sheath pin 1 and welding the whole periphery by a laser or the like.

A pair of lead wires 4 arranged at the other end of the sheath pin 1 are each electrically connected by welding or with a connector to the other end of each core wire 1b (the lead wire coupling portions B1). The core wires of the lead wires 4 are made of a metal such as stainless steel, and connected to an external circuit (such as the ECU of the vehicle), not shown, at an end far from the portion where the core wires 1b of the sheath pin 1 are connected.

This temperature sensor 100, like the temperature sensor 200 described above, is mounted in the exhaust gas passage A1 in such a manner that the sheath pin 1 thereof is inserted in the hole A3 formed in the wall portion A2 of the exhaust gas passage A1 and the temperature sensitive element 2 is arranged in the exhaust gas passage A1.

The hole A3 is formed in the mounting nut (mounting means) A4 fitted in the wall portion A2 in this case. The hole A3 has a large-diameter threaded portion outside of the exhaust gas passage A1, and a small-diameter portion smaller in diameter than the threaded portion inside the exhaust gas passage A1. Between the large-diameter portion and the small-diameter portion, a tapered conical portion is formed with the hole diameter thereof progressively decreasing from the large-diameter portion to the small-diameter portion.

A rib 5 constituting a seal member is arranged in such a manner as to surround the whole periphery of a part of the outer cylinder 1a intermediate between the ends of the sheath pin 1. The rib 5 is annular in shape and has a conical seat surface 5a corresponding to the tapered portion of the hole A3. The seat surface 5a comes into close contact with the tapered portion, so that the exhaust gas is prevented from passing through the hole A3 and leaking out of the exhaust gas passage A1.

Also, the rib 5 has an annular protrusion 5b protruded along the axis of the outer cylinder 1a outward from the exhaust gas passage A1. The rib 5 constituting a seal member having this constitution is formed by cold forging or cutting a metal such as stainless steel.

The sheath pin 1 is inserted in the rib 5, and the end 5c of the rib 5 nearer to the exhaust gas passage A1 is welded over the whole outer peripheral surface of the outer cylinder 1a (coupling portion C1) by laser welding or the like. In this way, the rib 5 is integrated with the sheath pin 1 and supports the sheath pin 1.

Also, the connecting portions between the core wires 1b and the lead wires 4 (the lead wire coupling portions B1) are protected by being covered with a cylindrical metal sleeve (protective member) 6 of SUS304 or the like. The sleeve 6 has an inner diameter sufficient for insertion of the sheath pin thereinto and is in the shape of a straight cylinder with the same diameter along the axis thereof.

The sleeve 6 is coupled to the rib 5 in such a manner that the outer peripheral surface of the annular protrusion 5b and the inner peripheral surface of the sleeve 6 are welded to each other over the whole periphery (coupling portion C2) by laser or the like in the portion outward of the coupling portion C1 between the rib 5 and the outer cylinder 1a as viewed from the exhaust gas passage A1. Also, the end (mouth) of the sleeve 6 far from the coupling portion C2 is caulked through a rubber bush 7, where a pair of the lead wires 4 are fixed while at the same keeping water and oil out of the interior of the sleeve 6. The temperature sensor 100 according to this embodiment having the constitution described above is mounted in the exhaust gas passage A1 in the manner described below in more detail.

As the sensor is inserted into the hole A3 from outside of the exhaust gas passage A1, the seat surface 5a of the rib 5 mounted on the sheath pin 1 comes to a stop as it is brought into close contact with the tapered portion of the hole A3, so that the temperature sensitive element 2 is successfully arranged in the exhaust gas passage A1.

The rotatable screw A5 that has been inserted in the sleeve (protective member) 6 in advance is screwed in the threaded hole A3 by turning, and the rib 5 is pressed by the forward end of the sleeve 6, so that the seat surface 5a is press-fitted on the tapered portion of the hole A3. In this way, the temperature sensor 100 is fixed on the wall portion A2 of the exhaust gas passage A1.

The temperature sensor 100 mounted in the exhaust gas passage A1 as described above has the following effects of operation.

It is described above that the temperature sensor 100 is fixed by forcing the screw A5 in the mounting nut A4 on the exhaust gas passage A1 so that the seat surface 5a formed on the rib (seal member) 5 of the temperature sensor 100 is pressed against the tapered portion formed in the hole A3. As a result, the exhaust gas is prevented from leaking out of the exhaust gas passage A1.

In the process, with the conventional structure shown in FIG. 1A, the coupling portion D1 between the wiring member 1 and the protective member J6 and the coupling portion D2 between the protective member J6 and the seal member J5 which are formed on the inner side of the exhaust gas passage A1 are exposed to the exhaust gas. As a result, the exhaust gas may leak outward through the routes P1 and P2 passing through the two welded points including the coupling portions D1 and D2 other than the tapered surface of the hole A3, thereby posing the problem of the reliability of leakage protection.

According to this embodiment shown in FIG. 2, in contrast, the coupling portion C1 between the sheath pin 1 and the sleeve 6 constitutes the sole welded point located in the leakage route connecting the exhaust gas passage A1 and the external environment. The coupling portion C2 between the sleeve 6 and the rib 5, which is located further away from the exhaust gas passage A1 than the coupling point C1, is not exposed to the exhaust gas. Thus, only the route P1 is assumed to constitute a leakage route, with the result that the reliability of leakage protection is increased to twice that of the conventional structure, thereby improving the reliability of sealing.

Also, in the conventional structure, the sleeve J6 is welded over the whole periphery of the outer cylinder 1a of the wiring member 1 in the exhaust gas passage A1, thereby leading to an increased volume of the temperature sensitive portion (the portion of the temperature sensor 200 extending from the seal member J5 toward the temperature sensitive element 2). In other words, a considerable amount of heat of the exhaust gas received by the element escapes by heat conduction of the metal pipes of both the wiring member 1 and the protective member J6, resulting in a deteriorated response and a deteriorated accuracy of the temperature sensor.

According to the first embodiment of the invention, in contrast, the rib (seal member) 5 is fixedly welded directly to the sheath pin (wiring member) 1, and therefore, the heat conduction from the temperature sensitive portion is caused only by the sheath pin 1, thereby improving the response and accuracy of the temperature sensor as compared with the conventional structure.

The next problem is how to reduce the diameter of the temperature sensitive portion for improving the response. In the conventional structure, a reduced diameter of the temperature sensitive portion, i.e., the wiring member 1 also requires the corresponding reduction in the diameter of the protective member J6 fixedly welded to the wiring member 1.

As is described above, however, the diameter of the protective member J6 contains the lead wire coupling portions B1, and therefore cannot be reduced further from the diameter of the portion of the protective member J6 protecting the coupling portions B1. A solution could be that, as shown to the right in FIG. 1B above, the straight form of the protective member (sleeve) J6 is replaced with a stepped protective member J6 in which the diameter of the portion protecting the coupling portions B1 is kept the same while reducing the diameter of only the coupling portion with the wiring member 1. This solution, however, requires a drawing process in addition to the pipe cutting process for the sleeve, thereby considerably increasing the machining cost.

According to this embodiment, in contrast, the straight sleeve 6 is welded along the whole periphery of the protrusion 5b of the rib 5 formed on the side thereof far from the temperature sensitive portion. It is not necessary, therefore, to change the shape of the sleeve 6 in accordance with the diameter of the sheath pin 1. The inner diameter of the rib 5 coupled to the sheath pin 1 is required to be reduced in accordance with the reduced size of the sheath pin. The change in the inner diameter of the rib 5, however, is not accompanied by any change in the number of machining steps of the work and therefore does not lead to an increased cost.

The structure of the first embodiment is somewhat complicated as compared with the shape of the rib (seal member J5) due to the presence of the protrusion 5b shown in FIG. 1A. Such a structure, however, can be fabricated by inexpensive cold forging and therefore does not contribute to an increased cost.

According to this embodiment, therefore, the radius of the sleeve 6 can be increased more than the radius of the sheath pin 1 at least by the thickness of the protrusion 5b of the rib 5 while keeping the straight form of the sleeve 6. Thus, a sufficient space can be secured for the portion to protect the coupling portion B1 of the lead wires, and at the same time, the outer diameter of the outer cylinder 1a, i.e. the outer diameter of the sheath pin 1 can be reduced, so that the sensor can be reduced in diameter without increasing the cost.

Example dimensions of the parts of the temperature sensor 100 reduced in diameter for improving the response will be described below. The outer diameter of the metal cap 3 can be reduced to 3 mm, the outer diameter of the sheath pin 1 to 2.3 mm, the outer diameter of the sleeve 6 to 7 mm, the inner diameter of the sleeve 6 to 6 mm, and the screw A5 to M12. In other words, the outer diameter of the temperature sensitive portion is not more than 3 mm, which is a considerable reduction in diameter as compared with the outer diameter of 6 mm of the conventional temperature sensitive portion.

Instead of forming the protrusion 5b on the rib 5 along the axis of the outer cylinder 1a outward of the exhaust gas passage A1, the end of the rib 5 outward of the exhaust gas passage A1 may be directly coupled to the cylindrical end surface of the sleeve 6. In the first embodiment, however, the inner peripheral surface of the sleeve 6 is coupled to the outer peripheral surface of the protrusion 5b. As compared with the coupling at the cylindrical end surface of the sleeve 6, therefore, a large coupling area can be secured for an improved coupling strength.

(Second embodiment)

Figure 3A:
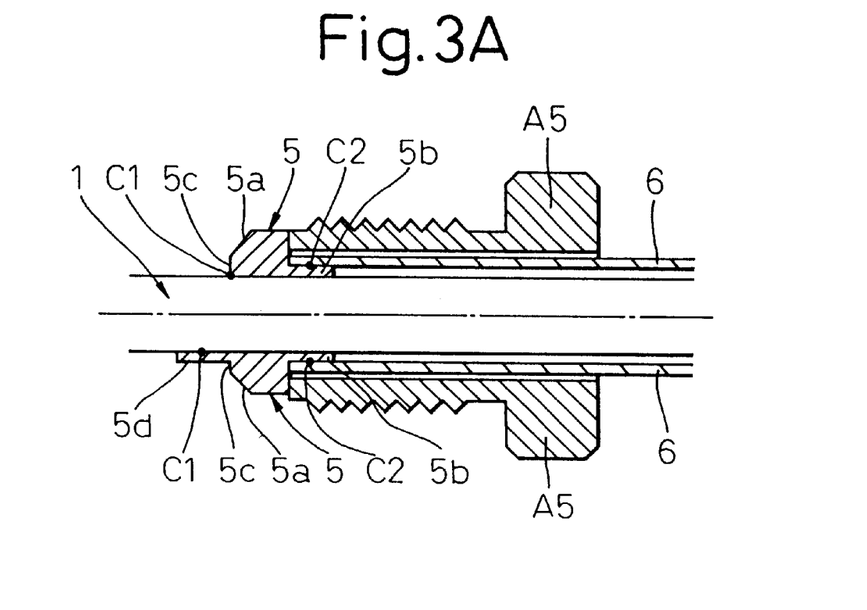
FIGS. 3A, 3B are diagrams for explaining a second embodiment of the invention.
Figure 3B:
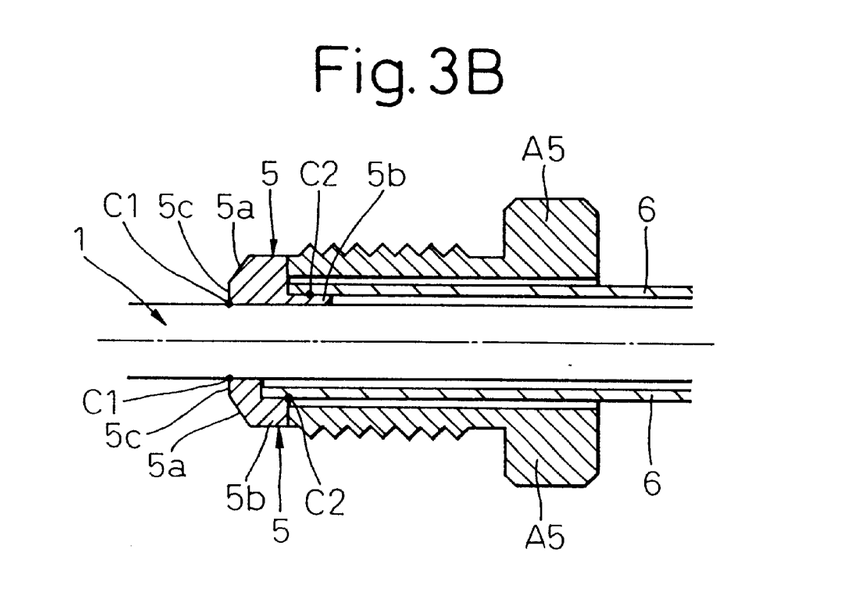

A second embodiment of the invention is shown in FIGS. 3A, 3B. In FIGS. 3A, 3B, the portion under the center line illustrates modifications of the rib 5, and the rib 5 according to the first embodiment of FIG. 2 is shown above the center line for comparison. As is shown in the modification of FIG. 3A, the rib 5 and the sheath pin 1 are coupled to each other in such a manner that a protrusion 5d toward the temperature sensitive portion is formed from the end surface 5c of the rib 5 thereby to couple with the entire outer peripheral surface of the outer cylinder 1a of the sheath pin 1.

Also, as is shown in FIG. 3B as another modification, the protrusion 5b of the rib 5 may be formed at a distance from the outer cylinder 1a of the sheath pin 1 unlike in FIG. 2, and the inner peripheral surface of the protrusion 5b may be coupled with the outer peripheral surface of the sleeve 6.

(Third embodiment)

Also, with the structure shown in FIG. 2, the sheath pin 1 may be broken or the coupling portions B1 between the core wires 1b and the lead wires 4 may break when the sheath pin 1 is vibrated or distorted. In order to suppress these forced vibrations of the sheath pin 1, the sheath pin 1 and the sleeve 6 may be fixedly caulked according to the third embodiment of the invention.

Figure 4A:
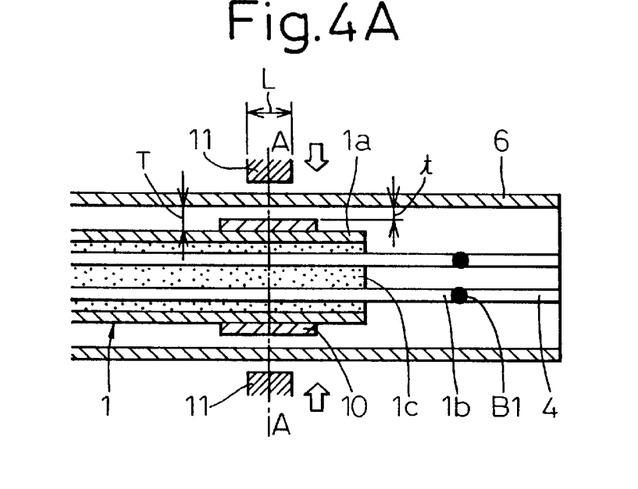
FIGS. 4A to 4E are diagrams showing examples caulked with a spacer interposed according to a third embodiment of the invention.
Figure 4B:
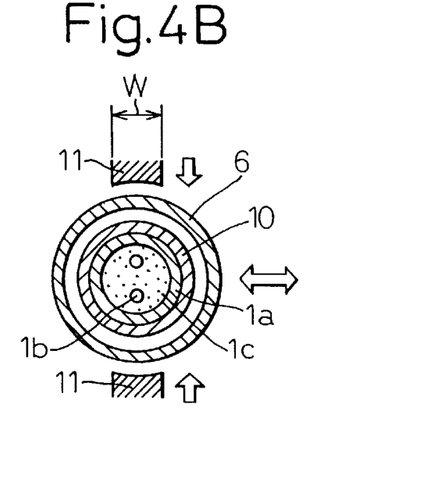
Figure 4C:
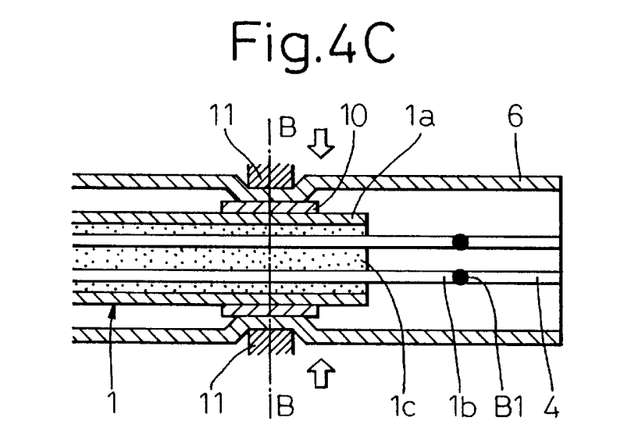
Figure 4D:
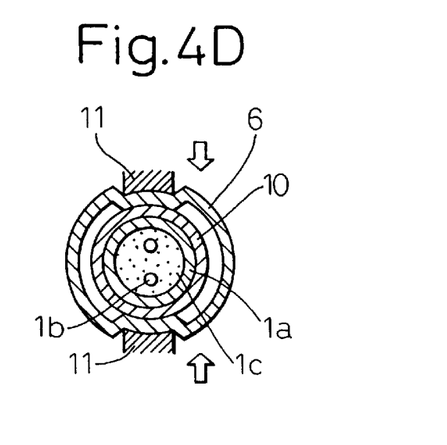
Figure 4E:
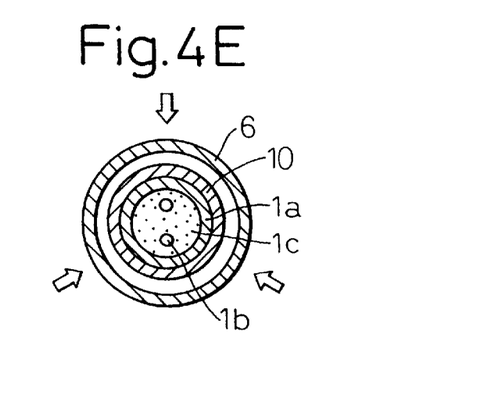

FIGS. 4A to 4E are diagrams for explaining the process for fixing by caulking. FIGS. 4A to 4C are sectional views corresponding to FIG. 2, FIG. 4B is a sectional view taken in line A—A of FIG. 4A, and FIG. 4D is a sectional view taken in line B—B of FIG. 4C. FIG. 4E shows an example in which three points are caulked instead of two points in FIGS. 4A to 4D.

First, as shown in FIGS. 4A, 4B, the sheath pin 1 is inserted in a cylindrical spacer (spacer member) 10, and after interposing the spacer 10 between the sleeve 6 and the outer cylinder 1a of the sheath pin 1, as shown in FIGS. 4C, 4D, two points in opposed relation to each other along the circumferential direction are caulked from outside of the sleeve 6 using a caulking die 11. Then, a pair of the core wires 1b and the lead wires 4 are connected to each other (lead wire coupling portions B1).

Caulking points are preferably not less than two along the circumferential direction of the sleeve 6. This caulking is of standard size, and the caulking size is set in such a manner that the gap t between the inner surface of the sleeve 6 and the spacer 10 is zero even for the most loose caulking.

Also, the caulking width, i.e. the width W of the caulking die 11, as shown in FIG. 4E, is not specifically defined as far as there are three or more equidistant caulking points along the circumferential direction (point contact can also be employed). In the case where there are two caulking points in opposed relation as shown in FIGS. 4A to 4D, however, the width W is preferably not less than one sixth of the outer peripheral diameter of the sheath pin 1 if only to suppress the displacement in the direction (indicated by the white bidirectional arrow in FIG. 4B) perpendicular to the caulking direction (indicated by the white unidirectional arrow in FIGS. 4A to 4D).

The caulking length L is not specifically defined.

The spacer 10 is made of SUS304 as a material thereof. This is in order to secure the same coefficient of thermal expansion for the outer cylinder 1a (SUS310S) of the sheath pin 1 and the sleeve 6 (SUS304). Also, the thickness of (the solid portion of) the spacer 10, as shown in FIG. 4A, can be set to 1 mm in the case where the gap (the difference between the inner diameter of the sleeve and the outer diameter of the sheath pin) T between the inner peripheral surface of the sleeve 6 and the outer peripheral surface of the outer cylinder 1a is 1.8 mm.

The thickness of the spacer 10, however, depends on various factors such as the gap T, the outer diameter and thickness of the sleeve and the shape of the caulking die 11 (caulking width W). The thickness of the spacer 10 is sufficient if it meets the conditions that the gap T can be filled not to cause a caulking crack in the sleeve 6 and that the workability of the caulking to the sheath pin is superior.

In short, the spacer 10 is for preventing the generation of caulking cracks due to the factors described above when caulking the sleeve 6 (for example, by reducing the large caulking rate when the gap T is large). In the case where no caulking crack of the sleeve 6 is likely to be generated, the spacer 10 is not required.

Also, the caulking portion is preferably in the neighborhood of the end surface of the sheath pin 1 nearer to the coupling portions B1 for suppressing the vibrations of the sheath pin 1. It should be noted, however, that the caulking at an extreme end surface is liable to collapse the layer of the insulating powder 1c such as magnesia (MgO) filled in the sheath pin 1.

Figure 5A:
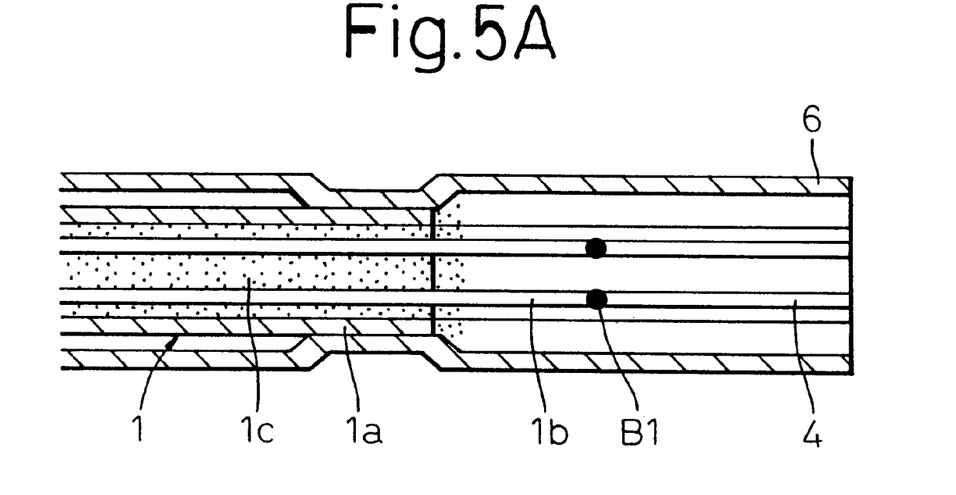
FIGS. 5A, 5B are diagrams showing examples caulked without any spacer according to the third embodiment of the invention.
Figure 5B:
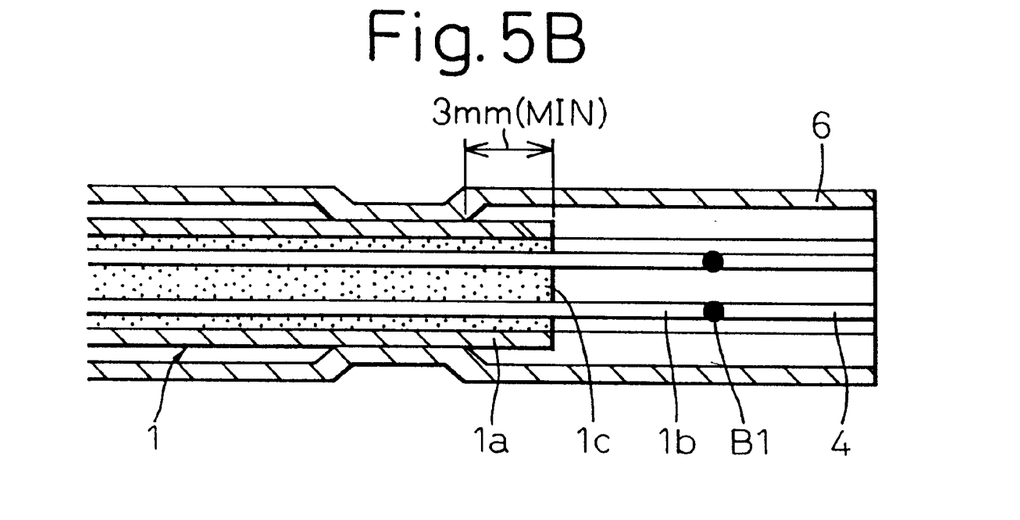

FIGS. 5A, 5B show examples of caulking the sleeve 6 without the interposition of the spacer. As is shown in FIG. 5A, for example, once the insulating powder 1c filled in the sheath pin 1 is collapsed, the interior of the sheath pin 1 is liable to absorb humidity, with the probable result that the holding force of the core wires 1b is reduced or the outer cylinder 1a and the core wires 1b are liable to be shorted to each other.

For this reason, as shown in FIG. 5B, the caulking is carried out at a point at least 3 mm away from the end surface of the sheath pin 1 and nearer to the coupling portions B1.

(Other embodiments)

In each of the embodiments described above, the sheath pin 1 is coupled to the rib 5 and the rib 5 is coupled to the sleeve 6 by welding along the entire periphery using a laser. However, the welding method is not limited to a laser method but can use a plasma method as well. Also, brazing can be used in the case where the temperature of the coupling portion in operation is not higher than that of the brazing material.

Also, a temperature sensor according to this invention is applicable not only to an exhaust gas temperature sensor but also to a temperature sensor mounted in a passage in which an object fluid such as water or oil flows.

In short, the present invention is not limited to the embodiments shown in the accompanying drawings, but can be embodied within the scope defined by claims.

What is claimed is:

1. A temperature sensor in combination with a wall portion and an attachment device attaching the temperature sensor to the wall, the temperature sensor comprising:

a wiring member for holding conductive core wires in a metal outer cylinder through an insulating material;

a temperature sensitive element connected to an end of the core wires at an end of said wiring member;

lead wires connected at a connecting portion to the other end of said core wires at the other end of said wiring member;

a metal seal member directly welded to an outer peripheral surface of said metal outer cylinder, said seal member being constructed and arranged to engage and be kept in close contact with a surface of a hole formed in the wall portion when said sensor is inserted therein and attached to the wall portion with the attachment device, for preventing the leakage of an object fluid from said hole, the wall portion defining a passage in which the object fluid is to flow; and a cylindrical protective member for covering a connecting portions between said core wires arid said lead wires;

wherein said protective member is coupled to said seal member at a portion of said seal member farther away from said temperature sensitive element than a weld between said seal member and said outer cylinder.

2. A temperature sensor according to claim 1, wherein said seal member includes a protrusion protruded along the axis of said outer cylinder outward of said temperature sensitive element; and wherein said protective member is coupled to the outer peripheral surface of said protrusion.

3. A temperature sensor according to claim 1, wherein said seal member includes a protrusion protruded along the axis of said outer cylinder outward of said temperature sensitive element; and wherein said protective member is coupled to the inner peripheral surface of said protrusion.

4. A temperature sensor according to claim 1, wherein said protective member and said outer cylinder of said wiring member are fixedly caulked to each other.

5. A temperature sensor according to claim 1, further comprising a mounting mechanism constructed and arranged to secure said temperature sensor in position within said mounting portion, said mounting mechanism adapted to be inserted into said hole and forcefully engage said seal member so that said seal member is kept in close contact with said surface of said hole.

6. A temperature sensor according to claim 5, wherein said seal member is constructed and arranged to be kept in close contact with a seat surface formed in said hole.

7. A temperature sensor according to claim 5, wherein said mounting mechanism comprises a screw forming a through-bore, the threads on an outer surface of said screw being adapted to engage receiving threads formed in said hole.

8. A temperature sensor according to claim 1, said hole is formed in a mounting portion of said wall portion.

9. A temperature sensor according to claim 2, wherein said protective member and said outer cylinder of said wiring member are fixedly caulked to each other.

10. A temperature sensor according to claim 3, wherein said protective member and said outer cylinder of said wiring member are fixedly caulked to each other.

11. A temperature sensor according to claim 4, wherein said protective member is caulked with a spacer member interposed between said protective member and the outer cylinder of said wiring member.

12. A temperature sensor according to claim 9, wherein said protective member is caulked with a spacer member interposed between said protective member and the outer cylinder of said wiring member.

13. A temperature sensor according to claim 10, wherein said protective member is caulked with a spacer member interposed between said protective member and the outer cylinder of said wiring member.

* * * * *